(12) United States Patent
Iwano et al.

(10) Patent No.: US 9,328,782 B2
(45) Date of Patent: May 3, 2016

(54) TWO-WAY CLUTCH

(71) Applicant: NSK-Warner K.K., Tokyo (JP)

(72) Inventors: Akira Iwano, Fukuroi (JP); Takaya Yamada, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 23 days.

(21) Appl. No.: 14/265,598

(22) Filed: Apr. 30, 2014

(65) Prior Publication Data

US 2014/0326565 A1    Nov. 6, 2014

(30) Foreign Application Priority Data

May 1, 2013    (JP) ................................. 2013-096243

(51) Int. Cl.
    *F16D 41/10*    (2006.01)
    *F16D 41/08*    (2006.01)
    *B60K 6/383*    (2007.10)

(52) U.S. Cl.
    CPC ............... *F16D 41/105* (2013.01); *B60K 6/383* (2013.01); *F16D 41/088* (2013.01)

(58) Field of Classification Search
    None
    See application file for complete search history.

(56) References Cited

U.S. PATENT DOCUMENTS

| 2004/0116226 A1* | 6/2004 | Baker et al. ...................... 475/5 |
| 2009/0229945 A1* | 9/2009 | Sato .......................... 192/110 R |
| 2010/0072017 A1* | 3/2010 | Joki et al. ........................ 192/44 |

FOREIGN PATENT DOCUMENTS

| JP | 05-209637 A | 8/1993 |
| JP | 2002-005200 A | 1/2002 |

OTHER PUBLICATIONS

Office Action issued Apr. 21, 2015, in Japanese Patent Application No. 2013-096243.

* cited by examiner

*Primary Examiner* — Ramya Burgess
*Assistant Examiner* — Mark Manley
(74) *Attorney, Agent, or Firm* — Shapiro, Gabor and Rosenberger, PLLC

(57) ABSTRACT

A two-way clutch includes an outer race having a cam section in an inner periphery, an inner race that is separated in an inside diameter direction with respect to the outer race, and is disposed concentrically to be relatively rotatable, a torque transmission member that is disposed between the outer race and the inner race, and transmits torque, a cage that is capable of engaging with the torque transmission member and is movable in a circumferential direction, a drag strip that is supported by the cage, and a switching mechanism that can cause the two-way clutch to take at least a state locked in two directions by causing the drag strip to slide onto the inner race.

6 Claims, 5 Drawing Sheets

TWO-WAY CLUTCH

BACKGROUND OF THE INVENTION

1. Field of the Invention

The present invention relates to a two-way clutch for use in a power transmission mechanism, an auxiliary driving system and the like of an automobile, and transmits and cuts off rotational torque in two directions of a normal rotation direction and a reverse rotation direction.

2. Description of the Related Art

In general, a two-way clutch is used as a unit that switches the transmission path for power in a power transmission mechanism, an auxiliary driving system and the like of an automobile. For example, when a hybrid vehicle having two power sources that are an internal combustion engine and an electric motor travels by the electric motor in addition to the internal combustion engine, the rotation of the electric motor is transmitted to the output shaft via a two-way clutch in both normal and reverse rotation directions. Further, as described in Japanese Patent Application Laid-Open No. 2002-5200, two-way clutches are also adopted in an auxiliary drive system using an electric motor in combination, a center differential of a four-wheel vehicle and the like.

In the two-way clutch in Japanese Patent Application Laid-Open No. 2002-5200 described above, a cylindrical surface is formed in any one of an inner race and an outer race, while a cam surface is formed in the other one of the inner race and the outer race, and rollers as torque transmission members are interposed between the cylindrical surface and the cam surface. The two-way clutch adopts the structure that retains the rollers in the neutral position or one of the engaging positions by a spring or a leaf spring, and switches the phase of the cage that retains the torque transmission member by an electromagnetic clutch mechanism or a friction drive mechanism.

However, the two-way clutch in which the torque transmission member is retained in the neutral position of the cam surface has the structure in which the torque transmission member is retained by an urging unit provided in the cage, and therefore, has the problem that the torque transmission member cannot be reliably retained in the neutral position. In the two-way clutch in which the torque transmission member is retained in one of the engaging positions of the cam surface, the cylindrical surface and the torque transmission member slide in contact with each other, and therefore, there is the problem that drag torque (dragging torque) occurs at a non-operation time of the two-way clutch (idling time) and reduction in fuel efficiency and the like due to the drag torque occurs.

SUMMARY OF THE INVENTION

Accordingly, an object of the present invention is to provide a two-way clutch that can switch to three modes of being free in two directions, locked in one direction, and locked in the two directions with a simple structure, and does not generate drag torque in the mode of being free in the two directions.

In order to attain the above described object, a two-way clutch of the invention of the present application is a two-way clutch, and includes an outer race having a cam section in an inner periphery, an inner race that is separated in an inside diameter direction with respect to the outer race, and is disposed concentrically to be relatively rotatable, a torque transmission member that is disposed between the outer race and the inner race, and transmits torque, a cage that is capable of engaging with the torque transmission member and is movable in a circumferential direction, a drag strip that is supported by the cage, and a switching mechanism that can cause the two-way clutch to take at least a state locked in two directions by causing the drag strip to slide onto the inner race.

According to the present invention, the following effect is obtained.

The two-way clutch can be provided, which can switch to three modes of being free in two directions, locked in one direction and locked in the two directions with a simple structure, and does not generate drag torque in the mode of being free in the two directions.

Further features of the present invention will become apparent from the following description of exemplary embodiments with reference to the attached drawings.

The term "torque transmission member" used in the present invention indicates a member that engages (meshes) with a cam surface of an outer race, and an outer circumferential face of an inner race, and transmits torque. The torque transmission member may be in any shape as long as the shape allows the torque transmission member to engage with the cam surface of the outer race. As an example of the torque transmission member, various forms such as a roller, a sphere, and a spherical sprag can be adopted.

DESCRIPTION OF THE EMBODIMENTS

Preferred embodiments of the present invention will now be described in detail in accordance with the accompanying drawings.

Hereinafter, the present invention will be described in detail with reference to the drawings. Note that embodiments which will be described hereinafter are for describing the present invention as illustration, and do not limit the present invention as a matter of course. Further, the same parts in the respective drawings are shown by the same reference signs.

(First Embodiment)

Figure 1:
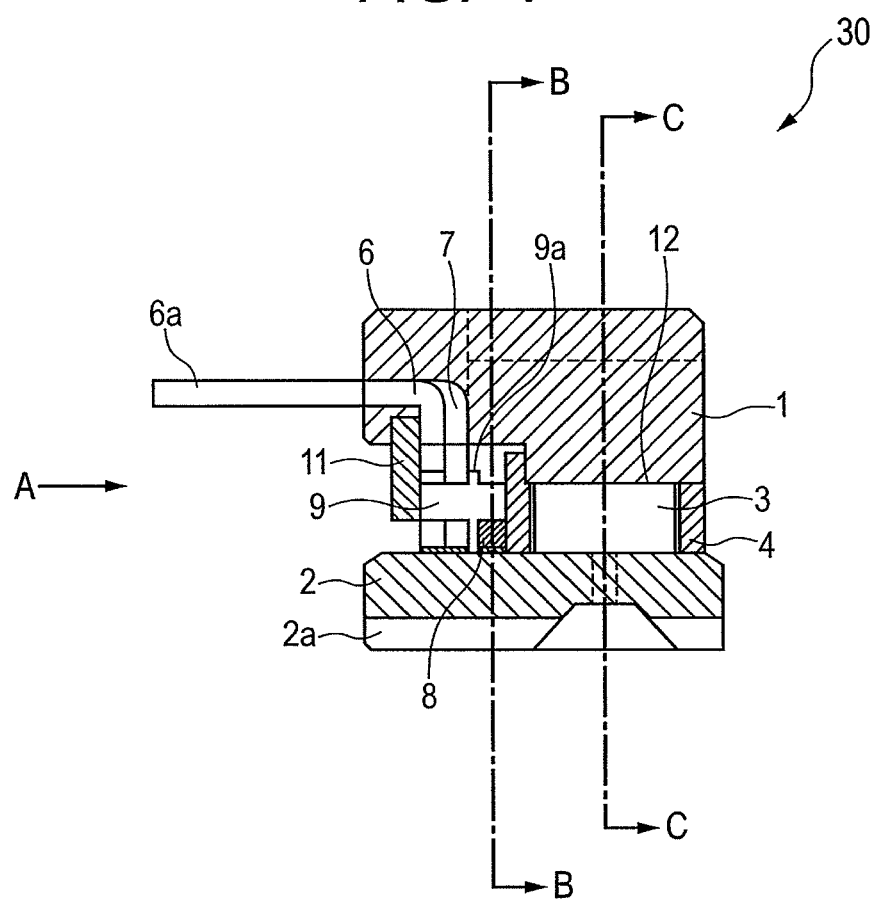
FIG. 1 is a partial sectional view in an axial direction of a two-way clutch illustrating a first embodiment of the present invention.

FIG. 1 is a partial sectional view in an axial direction illustrating a two-way clutch according to a first embodiment of the present invention.

As shown in FIG. 1, a two-way clutch 30 includes an outer race 1 in an annular shape, and an inner race 2 that is relatively rotatable with the outer race 1, and is disposed concentrically with the outer race 1 in an inside diameter side of the outer race 1. The inner race 2 is driven by a drive shaft (not illustrated) that is fitted to a spline section 2a, and is rotatable in two directions, a clockwise direction and a counterclockwise direction.

A plurality of cam sections 12 (see FIGS. 4A to 4D) each formed by a curved surface are formed on an inner periphery of the outer race 1, and rollers 3 are interposed between an outer circumferential face 25 of the inner race 2 and the respective cam sections 12. At both ends in a circumferential direction of the cam section 12, cam surfaces 27 and 28 with which the roller 3 is meshed are provided. The roller 3 is retained in a cage 4 that is disposed between the outer race 1 and the inner race 2.

On one end face in the axial direction of the two-way clutch 30, annular switching plates 6 and 7 (described in detail later) that are rotatably fitted to the outer race 1 in a predetermined range are provided. By switching levers 6a and 7a of the switching plates 6 and 7, the cage (described later) is controlled, and a rotational direction of the two-way clutch is controlled.

The two-way clutch 30 includes the rollers 3 as torque transmission members that are disposed between the outer race 1 and the inner race 2, and transmit torque. The two-way clutch 30 further has the cage 4 capable of engaging with the rollers 3 and is rotatable in a circumferential direction, and a spring 5 (see FIGS. 4A to 4D) that is supported by the cage 4 and is capable of urging the rollers 3 to engage with the cam section 12.

The two-way clutch 30 includes a pin 9 that engages with the switching plates 6 and 7. In one end side in the axial direction of the two-way clutch 30, an annular snap ring 11 is fixed to a groove provided in the inner periphery of the outer race 1 to be incapable of moving in the axial direction. Since the snap ring 11 is provided, the pin 9, the switching plates 6 and 7, the cage 4 and the rollers 3 do not fall off in the axial direction.

FIG. 2A to FIG. 2D are front views of the two-way clutch seen from the arrow A direction in FIG. 1, and each illustrate a relative positional relation of the switching plates and the pin. Illustration of the snap ring 11 is omitted. The switching plates 6 and 7 that are annular plates are disposed in a state overlaid on each other. The switching plate 6 is exposed to an outer side.

As is understandable from FIG. 1 and FIGS. 2A to 2D, the switching plate 6 at the outer side includes the lever 6a that extends in the axial direction, and the switching plate 7 at an inner side includes the lever 7a that extends in the axial direction, respectively. The lever 6a is integrally bent from a distal end of a protruded portion 6b protruding outward in a radial direction from the switching plate 6, and extends in the axial direction. Similarly, the lever 7a is integrally bent from a distal end of a protruded portion 7b protruding outward in a circumferential direction from the switching plate 7 and extends in the axial direction.

The switching plates 6 and 7 are fitted to the inner periphery of the outer race 1, and are rotatable in the circumferential direction with the outer race 1 as a center. The protruded portions 6b and 7b of the switching plates 6 and 7 are fitted in a groove 19 and a groove 20 in the circumferential direction that is respectively provided in the outer race 1. The groove 19 and the groove 20 in the circumferential direction are formed between protruded portions 1a that extend in the axial direction of the outer race 1. Further, the protruded portions 6b and 7b have shapes complementary with a contour of the protruded portion 1a. Accordingly, the switching plates 6 and 7 are rotatable in widths in the circumferential direction of the groove 19 and the groove 20.

The switching plate 6 has a long hole 6c that penetrates in the axial direction and extends in the radial direction, and the switching plate 7 has a long hole 7c that penetrates in the axial direction and extends in the circumferential direction. The long hole 7c includes an outside diameter side region 16 and an inside diameter side region 17, and both the regions are connected by an inclining region 18. The single pin 9 is fitted in the long holes 6c and 7c. The pin 9 is movable in the radial direction in the long hole 6c, and is movable in the circumferential direction along the shape of the long hole in the long hole 7c. The pin 9 is not fixed to other members, but an end portion is retained by the cage 4 and a protruded portion 9a is retained by the switching plate 7 respectively in the axial direction. Therefore, the pin 9 does not fall off in the axial direction.

In the present invention, the switching plates 6 and 7 construct a switching mechanism. The switching mechanism can cause the two-way clutch 30 to take at least the state locked in two directions.

FIG. 3A to FIG. 3D are partial sectional views of the two-way clutch along the B-B line in FIG. 1, illustrating the first embodiment of the present invention, and illustrates a relative positional relation of the cage, the pin, a drag strip and the switching plates. A drag strip 8 having predetermined elasticity is in a cantilevered shape, and integrally includes an extending portion 35, a curved portion 36 continuing from the extending portion 35, and a cantilever end portion 37 continuing from the curved portion 36. (The curved portion 36 contacts an outer circumferential face 25 of the inner race 2 and can generate friction). The drag strip 8 is supported by the cage 4 at both ends thereof in the circumferential direction, and therefore, cannot move for itself in the circumferential direction and follows movement of the cage 4.

The cage 4 that retains the rollers 3 includes an extending portion 4d that extends in the circumferential direction and a groove 4a provided at an inside diameter side of the extending portion 4d. The cantilever end portion 37 of the drag strip 8 is inserted into the groove 4a, and is retained. The cage 4 is relatively rotatable with respect to the outer race 1. The drag strip 8 is capable of sliding onto the outer circumferential face 25 of the inner race 2 at the curved portion 36. As is understandable from FIG. 3A to FIG. 3D, the pin 9 is disposed to be contactable to the drag strip 8 at the outside diameter side of the extending portion 35 of the drag strip 8. The extending portion 35 is longer than the cantilever end portion 37.

Figure 4A:
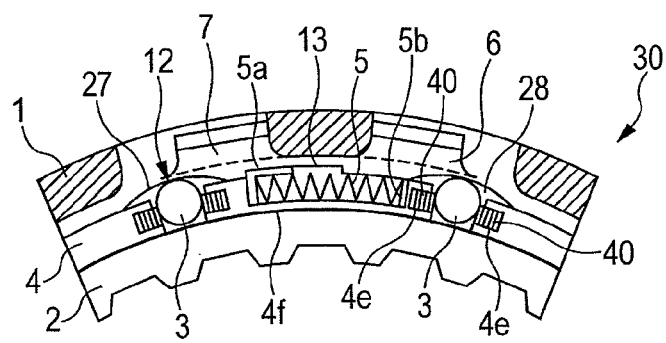
FIGS. 4A, 4B, 4C and 4D are partial sectional views of the two-way clutch along the C-C line in FIG. 1, illustrating the first embodiment of the present invention, and each illustrate a relative positional relation of rollers, the cage, and the switching plates.
Figure 4B:
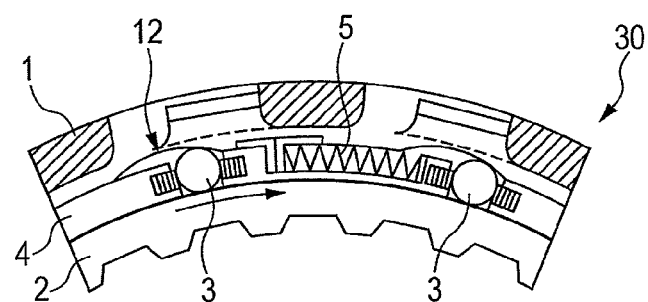
Figure 4C:
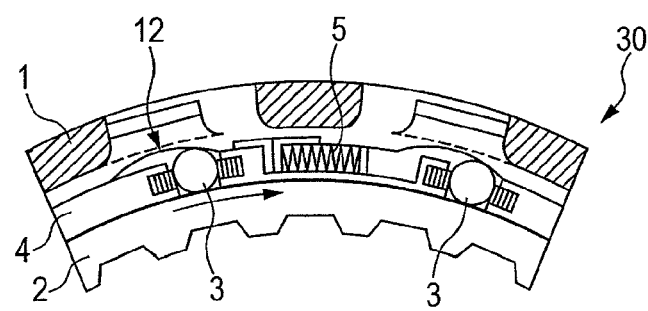
Figure 4D:
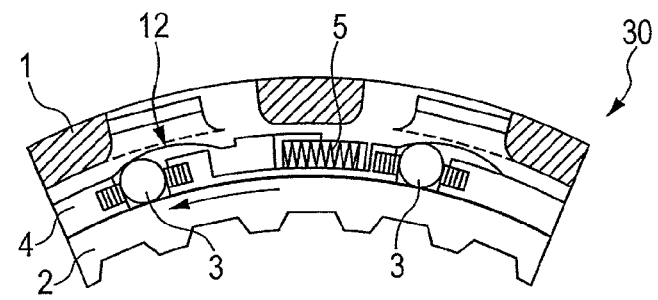

FIG. 4A to FIG. 4D are partial sectional views of the two-way clutch along the C-C line in FIG. 1, illustrating the first embodiment of the present invention, and each illustrate a relative positional relation of the rollers, the cage and the switching plates. The roller 3 is held and urged from both sides in the circumferential direction by springs 40 that are fitted in recessed portions provided in end portions 4e in the circumferential direction of the cage 4. Thereby, the roller 3 moves synchronously with movement of the cage 4. The arrows illustrated in FIG. 4B to FIG. 4D show meshing directions of the two-way clutch.

The spring 5 is disposed in a predetermined position in the circumferential direction between the roller 3 and the roller 3. A plurality of springs 5 are equidistantly placed in an annular shape. A part of the inside diameter of the cage 4 is a thin plate portion 4f, and the spring 5 is placed on the plate portion 4f. For the spring 5, a coil spring can be used.

Spring guides 5a and 5b are attached to both ends in the circumferential direction of the spring 5 that is placed on the plate portion 4f. Further, the spring guide 5a is connected to the switching plate 6 in the rotational direction. The spring 5 has a function of keeping the cage 4 in a neutral position by an urging force thereof.

The spring guide 5a has an L-shape in section, and has one side fitted in a recessed groove 13 provided in the inner periphery of the outer race 1. Accordingly, the spring guide 5a side of the spring 5 can displace within a range in which the spring guide 5a can slide in the circumferential direction in the recessed groove 13.

Second Embodiment

FIG. 5A to FIG. 5D are partial sectional views of a two-way clutch along the B-B line in FIG. 1, illustrating a second embodiment of the present invention, and each illustrate a relative positional relation of a cage, a pin, a drag strip and switching plates. FIG. 1 illustrates the section of the first embodiment, and in the case of the second embodiment, a part of a drag strip 21 is disposed at an outside diameter side of the pin 9 in FIG. 5A to FIG. 5D.

The second embodiment is substantially the same as the first embodiment in the basic structure, but differs in the structure of the drag strip. Further, in the second embodiment, the drag strip is located at the outside diameter side of the pin.

The drag strip 21 having predetermined elasticity integrally includes a main body portion 22, curved portions 23 that continue to the main body portion 22, are provided at both ends thereof, and contact the outer circumferential face 25 of the inner race 2 to be able to generate friction, and end portions 24 that continue to the curved portions 23. The drag strip 21 has a shape that is laterally symmetric with respect to the main body portion 22. Since the drag strip 21 is supported by the cage 4 at both the ends in the circumferential direction thereof, the drag strip 21 cannot move for itself in the circumferential direction, and follows movement of the cage 4.

The cage 4 that retains the rollers 3 includes extending portions 4c that extend in the circumferential direction and grooves 4b that are provided in an inside diameter side of the extending portions 4c. The cage 4 is capable of relatively rotating with respect to the outer race 1. The end portions 24 of the drag strip 21 are inserted into the grooves 4b and retained. The drag strip 21 is capable of abutting on the outer circumferential face 25 of the inner race 2 at the curved portions 23. As is understandable from FIG. 5A to FIG. 5D, the pin 9 is disposed to be contactable to the drag strip 21 at the inside diameter side of the main body portion 22 of the drag strip 21.

The drag strip 21 slides on the inner race 2 to generate a frictional force in a state attached to the cage 4. By switching the lever, the pin 9 disposed in the long hole 6c becomes movable in the radial direction. By movement of the pin 9 in the outside diameter direction, the drag strip 21 is lifted up and can be brought out of contact with the inner race 2. In the modes except for the mode of being locked in both directions (two directions), the drag strip 21 is kept in the lifted state so that the drag strip 21 does not function.

Figure 5A:
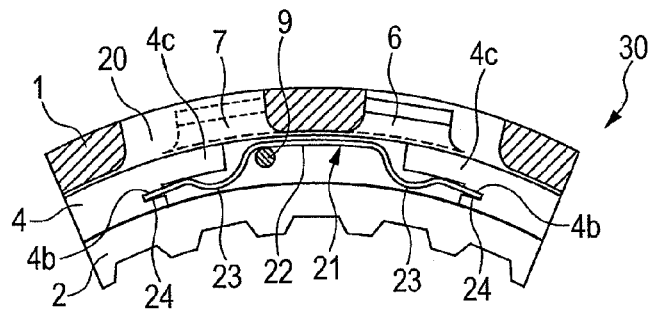
FIGS. 5A, 5B, 5C and 5D are partial sectional views of a two-way clutch along the B-B line in FIG. 1, illustrating a second embodiment of the present invention, and each illustrate a relative positional relation of a cage, a pin, a drag strip and switching plates.
Figure 5B:
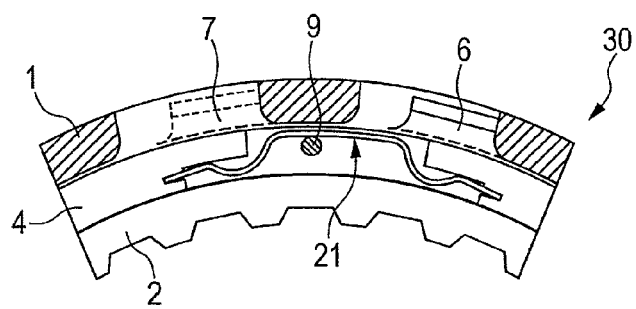
Figure 5C:
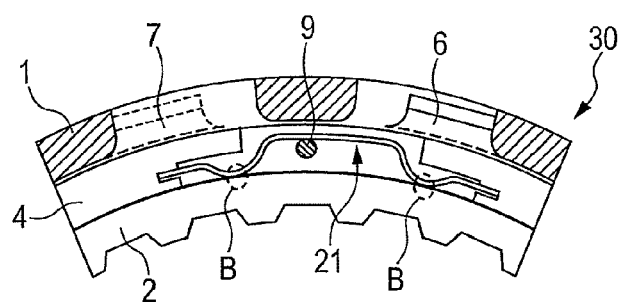
Figure 5D:
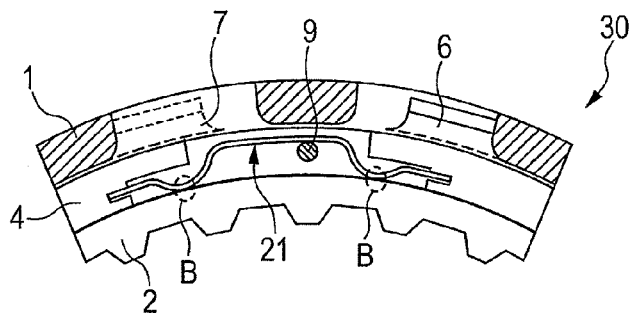

The state of FIG. 5A and FIG. 5B illustrate a state in which the curved portions 23 of the drag strip 21 are out of contact with the inner race 2 because the pin 9 is located at the outside diameter side, and retains the drag strip 21 at the outer diameter side, and FIG. 5C and FIG. 5D illustrate a state in which the pin 9 is located at the inside diameter side, and the curved portions 23 slides onto the inner race 5 at points B.

According to the second embodiment, the drag strip 21 is retained by the cage 4 at both the ends, and therefore, an operation thereof is stable. Further, the curved portions 23 that generate friction with the inner race are provided each at two spots, and therefore, the effect of co-rotating the cage 4 is large.

In both of the first and second embodiments described above, when the two-way clutch 30 is not locked in both the directions, namely, when the inner race 2 idles in the mode of being free in the two directions, the drag strips 8 and 21 are in the states out of contact with the inner race 2, or in the state sliding on the inner race 2 that hardly generates a frictional force, and the drag strips 8 and 21 hardly generate drag torque to the inner race 2.

[Operation of Two-way Clutch]

Hereinafter, operations of the two-way clutches of the first embodiment and the second embodiment of the present invention will be described.

(Two-way Free Mode <Non-operation time>)

Figure 2A:
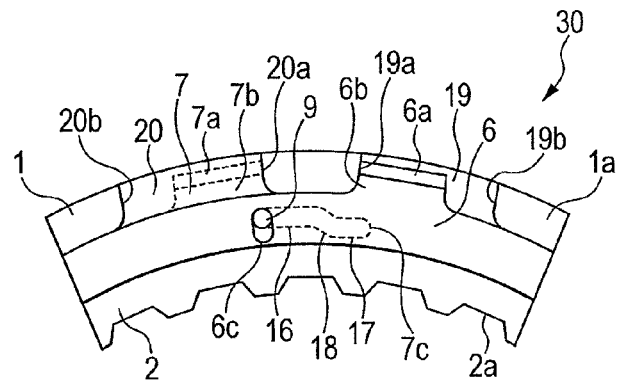
FIGS. 2A, 2B, 2C and 2D are front views of the two-way clutch seen from the arrow A direction in FIG. 1, illustrating the first embodiment of the present invention, and each illustrate a relative positional relation of switching plates and a pin.

In FIG. 2 to FIG. 5B, FIGS. 2A, 3A, 4A and 5A indicate that the two-way clutch 30 is in the neutral position, and is idling in both the rotational directions. As illustrated in FIG. 2A, the switching plate 6 that switches the operation state of the two-way clutch 30 is in contact with an end face 19a of the groove 19 of the outer race 1. Further, the switching plate 7 is in contact with an end face 20a of the groove 20 of the outer race 1.

Figure 3A:
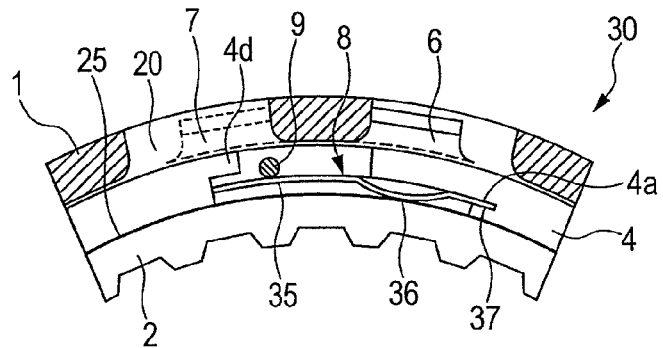
FIGS. 3A, 3B, 3C and 3D are partial sectional views of the two-way clutch along the B-B line in FIG. 1, illustrating the first embodiment of the present invention, and each illustrate a relative positional relation of a cage, a pin, a drag strip, and switching plates.
Figure 3B:
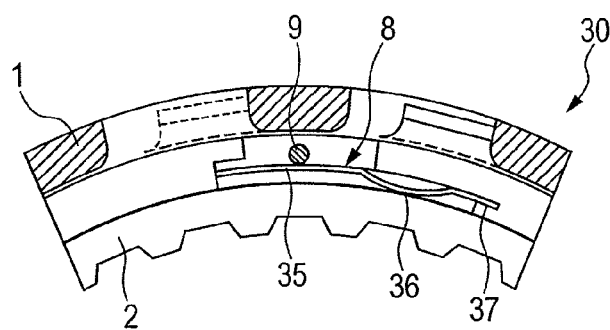

The pin 9 is located at the most outside diameter side of the long hole 6c of the switching plate 6, and is located at the closed end portion of the outside diameter side region 16 of the long hole 7c of the switching plate 7. Therefore, in this state, the pin 9 cannot move in the radial direction. In FIG. 3A which is a partial sectional view along the B-B line in FIG. 1, the pin 9 is in contact with an outside diameter surface of the extending portion 35 of the drag strip 8. At this point of time, the curved portion 36 of the drag strip 8 is in contact with the outer circumferential face 25 of the inner race 2, but only slides onto the inner race 2, and hardly generates a frictional force.

FIG. 4A and FIG. 5A illustrate the positions of the rollers 3 and the cage 4. The roller 3 sandwiched by the springs 40 fitted in the cage 4 is located in a central portion of the cam section 12 provided on the inner periphery of the outer race 1, and does not mesh with the cam surfaces 28 at both ends in the circumferential direction of the cam section 12. The spring 5 that gives an urging force for meshing with the cam surfaces 28 to the roller 3 is also in the neutral position. At the idling time, the cage 4 does not move in both the rotational directions, and is in a fixed state.

When an automobile is driven by an engine in a hybrid vehicle or the like, only the inner race 2 rotates in the two-way clutch 30. At this time, since the roller 3 is neutral with respect to the cam surfaces 27 and 28 as described above, rotation of the inner race 2 is not inhibited by the two-way clutch 30, and power loss and the like due to drag torque do not occur.

(Mode of Being Locked in One Direction <Torque Transmission>)

In FIGS. 2A to 2D to FIGS. 5A to 5D, FIGS. 2B, 3B, 4B and 5B indicate that the two-way clutch 30 is in an operating state, and indicate the state locked in one direction.

Figure 2B:
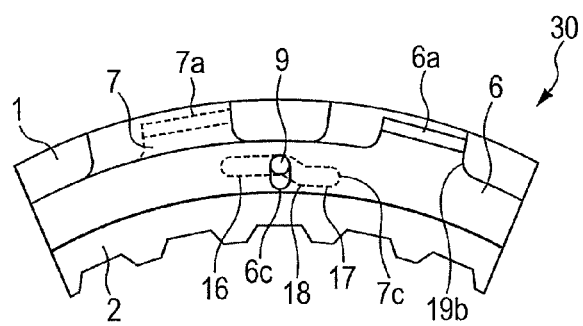

As illustrated in FIG. 2B, the lever 6a is operated from the idling state, and the switching plate 6 is rotated in the right direction in the drawing, and moved to the end face 19b of the groove 19. By the rotation, the pin 9 is moved in the circumferential direction by the long hole 6c. As a result, the pin 9 moves in the outside diameter side region 16 from the closed end portion of the outside diameter side region 16 of the long hole 7c of the switching plate 7 to a site adjacent to the inclining region 18. However, at this time, the position in the radial direction of the pin 9 is the same as that at the idling time, and remains at the outside diameter side.

Further, as shown in FIG. 4A, the switching plate 6 and the spring guide 5a are connected in the rotational direction, and therefore, in concurrence with rotation of the switching plate 6, the spring guide 5a also rotationally moves in the arrow direction of FIG. 4B. At this time, by the urging force of the spring 5, the cage 4 also rotates in the right direction via the spring guide 5b, but the rotation of the cage 4 stops in a position in which the roller 3 retained by the cage 4 is in contact with both the cam surface 28 of the outer race and the outer circumferential face of the inner race 2. In this state, the urging force of the spring 5 is applied to the roller 3 only in the right direction, and a state capable of being locked in one direction is brought about. When the inner race 2 rotates in the arrow directions in FIGS. 4B to 4D at this time, the inner race 2 is locked, and when the inner race 2 rotates in the opposite direction, the inner race 2 idles.

Locking in one direction described above is a mode that is used at a low-speed traveling time of a vehicle.

(Mode of Being Locked in Two Directions <Torque Transmission>)

Next, explanation will be given on the two-way clutch 30 being able to be locked when the inner race rotates in any direction of the two directions. In FIGS. 2A to 2D to FIGS. 5A to 5D, FIGS. 2C, 3C, 4C and 5C and FIGS. 2D, 3D, 4D and 5D illustrate that the two-way clutch 30 is in a locked state irrespective of the rotational direction of the inner race 2.

From the state in FIG. 2B, the switching plate 7 is rotated in the left direction in the drawing, and is moved to an end face 20b of the groove 20. At this time, the lever 6a and the lever 7a of the switching plates 6 and 7 are in positions which are the most apart from each other. With rotation of the switching plate 7, the long hole 7c also moves in the circumferential direction. The pin 9 passes through the inclining region 18 of the long hole 7c, and moves to a closed end portion of the inside diameter region 17.

Figure 2C:
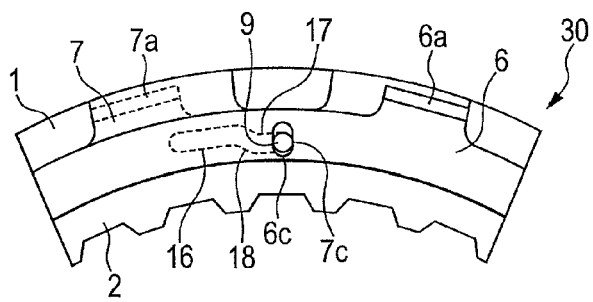

The pin 9 moves to the closed end portion of the inside diameter region 17 of the long hole 7c, whereby the pin 9 moves to the end portion at the inside diameter side in the long hole 6c. The pin 9 displaces to the inside diameter side within the range of the length of the long hole 6c substantially without changing the position in the circumferential direction. FIG. 2C illustrates the state.

Figure 3C:
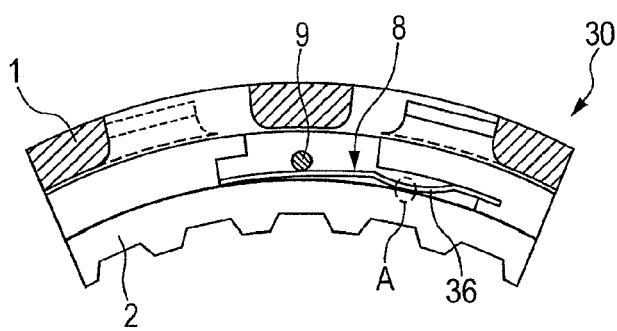

Referring to FIG. 3C corresponding to the state of FIG. 2C, it is understandable that the pin 9 displaces in the inside diameter direction, and the drag strip 8 is crushed in the inside diameter direction. This is because the pin 9 presses the extending portion 35 in the inside diameter direction. At this time, a part of the extending portion 35 abuts on the outer circumferential face 25 of the inner race 2. Thereby, the curved portion 36 of the drag strip 8 abuts on the outer circumferential face 25 of the inner race 2 with a predetermined frictional force.

Further, referring to FIG. 4C corresponding to the state of FIG. 2C, the switching plate 7 and the spring guide 5b are connected in the rotational direction, and therefore, the spring guide 5b also rotationally moves in the left direction in the drawing in concurrence with rotation of the switching plate 7. Since at this time, the urging force of the spring 5 remains in between the spring guides 5a and 5b, the urging force of the spring 5 is not applied to the cage 4, and the cage 4 is rotationally movable smoothly with respect to the outer race 1.

When the inner race 2 rotates in a clockwise direction in the state of FIG. 2C, the drag strip 8 moves in the same direction as the inner race 2 by co-rotating with rotation of the inner race 2, because the curved portion 36 is in frictional contact with the inner race 2 with a predetermined frictional force in a position illustrated by A in FIG. 3C. Thereupon, the cage 4 in a state integral with the drag strip 8 also rotates in the same direction as the inner race 2.

When the cage 4 rotates in the rotational direction of the inner race 2, the plurality of rollers 3 retained in the cage 4 also rotate in the arrow directions as shown in FIGS. 4B to 4D synchronously with the inner race 2. Thereby, all the rollers 3 mesh with the cam surfaces 28, and the two-way clutch 30 is locked in the clockwise direction. FIG. 4C illustrates the state.

Figure 2D:
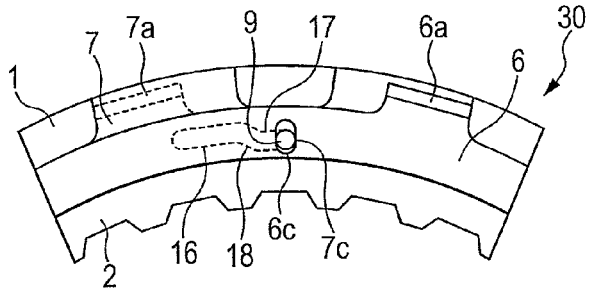
Figure 3D:
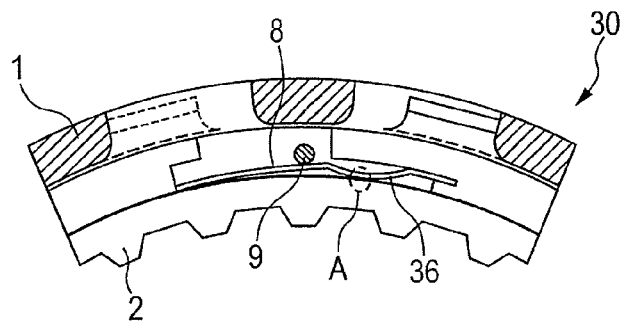

The case in which the inner race 2 rotates in a counterclockwise direction contrary to the above description will be considered. FIG. 2D is the same as FIG. 2C, and the positions of the pin 9, the switching plate 6 and the switching plate 7 are the same. However, when the inner race 2 rotates in the counterclockwise direction illustrated by the arrow as illustrated in FIG. 4D, the relative position of the drag strip 8 with respect to the pin 9 changes, and the pin 9 presses the drag strip 8 to the outer circumferential face 25 of the inner race 2 in the vicinity of a bottom of the extending portion 35. FIG. 3D illustrates the state.

As is understandable from FIG. 3D, in this state, a larger frictional force (load) than the state of FIG. 3C is exerted on the curved portion 36. With respect to rotation of the inner race 2, the drag strip 8 and the cage can co-rotate more reliably. In this case, as illustrated in FIG. 4D, all the rollers 3 mesh with the cam surfaces 27 of the cam sections 12.

Here, supplementary explanation will be given to the drag strip 8 in the cantilevered shape. When torque is transmitted in the mode being locked in two directions in which the inner race 2 is locked whichever direction the inner race 2 may be rotated in, the frictional force is generated between the inner race 2 and the curved portion with the drag strip 8 provided in the cage 4 as described above. However, a frictional force is also generated between the inner race 2 and the pin (the fixed component) that operates the drag strip, and therefore, the cage 4 hardly follows the movement of the inner race. Therefore, as in the first embodiment, the drag strip 8 is formed into the cantilevered shape, is operated with the pin 9 in the extending portion 35, and is brought into contact with the inner race in the curved portion 36.

The drag strip 8 and the cage 4 follow the movement of the inner race 2, and locking in both the directions is enabled. By the action of the load point of the cantilever, the frictional force generated between the curved portion 36 and the outer circumferential face 25 of the inner race 2 is larger than the frictional force that is generated between the pin 9 and the extending portion 35 by the load given to the extending portion 35 by the pin 9. Thereby, when the inner race 2 rotates, the pin 9 remains as it is, and by the frictional force generated at the curved portion 36, the drag strip 8 and the cage 4 in the state integral with the drag strip 8 follow the movement of the inner race 2 and move co-rotationally. As a result, the rollers 3 are moved, and can be locked in the rotational direction of the inner race 2.

In the drag strip 21 of the second embodiment, when the inner race 2 rotates in the clockwise direction, the drag strip 21 co-rotates with the rotation of the inner race 2 and moves in the same direction as the inner race 2, because the curved portion 23 is in frictional contact with the inner race 2 in a position shown by B in FIG. 5C. Thereupon, the cage 4 in the state integral with the drag strip 21 also rotates in the same direction as the inner race 2.

Since the curved portions 23 provided at the two spots are in contact with the outer circumferential face 25 of the inner race 2 as described above, the frictional force between the rotating inner race 2 and the drag strip is larger than the case of the first embodiment. Accordingly, the drag strip 21 and the cage 4 can be co-rotated more stably.

The mechanism of locking in the two directions by using the drag strips is effective in smooth switch of the torque transmission direction at a time of acceleration of a vehicle and at a time of engine braking.

The inclining region 18 provided at the long hole 7, out of the long hole 6c provided in the switching plate 6 and the long hole 7c provided in the switching plate 7 will be described. By the switching operation of the lever 7a, the pin 9 moves to the inside diameter region 17 from the outside diameter region 16 of the long hole 7c. At this time, the pin 9 passes through the inclining region 18. By setting the inclination angle of the inclining region 18, the pin 9 can be made easily movable in the long hole 7c. The inclination angle can be set at 10 to 70 degrees.

In each of the embodiments of the present invention described above, a plurality of rollers 3, springs 5, and drag strips 8 and 21 are provided in the circumferential direction.

The present invention can be used in an ordinary power transmission mechanism, and is also usable in a system that actuates an air-conditioner by only drive of an electric motor without driving an engine.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-096243, filed May 1, 2013, which is hereby incorporated by reference herein in its entirety.

What is claimed is:

1. A two-way clutch, comprising: an outer race having a cam section in an inner periphery; an inner race that is separated in an inside diameter direction with respect to the outer race, and is disposed concentrically to be relatively rotatable; a torque transmission member that is disposed between the outer race and the inner race, and transmits torque; a cage that is capable of engaging with the torque transmission member and is movable in a circumferential direction; a drag strip that is supported by the cage; and a switching mechanism that can cause the two-way clutch to take at least a state locked in two directions by causing the drag strip to slide onto the inner race,
wherein the switching mechanism is provided at a side surface of the cage, includes a rotatable annular switching plate including a lever, causes the drag strip to slide onto the inner race by displacing the lever in a circumferential direction, and thereby causes the two-way clutch to take any one of a state idling in both directions, a state locked in one direction only, and the state locked in two directions.

2. The two-way clutch according to claim 1,
wherein two of the switching plates are provided, the switching plates respectively include long holes in different shapes that penetrate in an axial direction, and a pin fitted in the long holes displaces in the long holes in response to displacement of the lever, whereby the drag strip is caused to slide onto the inner race, and the two-way clutch is caused to take any one of the state idling in both the directions, the state locked in one direction, and the state locked in the two directions.

3. The two-way clutch according to claim 1,
wherein the drag strip has a cantilevered shape including a cantilever end portion retained by the cage, a curved portion capable of sliding onto the inner race and an extending portion extending from the curved portion, and the pin engages with the extending portion.

4. The two-way clutch according to claim 1,
wherein the drag strip includes a main body portion, curved portions that continue to the main body portion, are provided at both ends thereof, and are in contact with the inner race to generate friction, and end portions that continue to the curved portions, and the pin engages with the main body portion.

5. The two-way clutch according to claim 1,
wherein the torque transmission member is a cylindrical roller.

6. A two-way clutch, comprising: an outer race having a cam section in an inner periphery; an inner race that is separated in an inside diameter direction with respect to the outer race, and is disposed concentrically to be relatively rotatable; a torque transmission member that is disposed between the outer race and the inner race, and transmits torque; a cage that is capable of engaging with the torque transmission member and is movable in a circumferential direction; a drag strip that is supported by the cage; and a switching mechanism that can cause the two-way clutch to take at least a state locked in two directions by causing the drag strip to slide onto the inner race,
wherein the switching mechanism is provided at a side surface of the cage, includes a rotatable annular switching plate including a lever, causes the drag strip to slide onto the inner race by displacing the lever in a circumferential direction, and thereby causes the two-way clutch to take any one of a state idling in both directions, a state locked in one direction only, and the state locked in two directions, and
wherein two of the switching plates are provided, the switching plates respectively include long holes in different shapes that penetrate in an axial direction, and a pin fitted in the long holes displaces in the long holes in response to displacement of the lever, whereby the drag strip is caused to slide onto the inner race, and the two-way clutch is caused to take any one of the state idling in both the directions, the state locked in one direction only, and the state locked in the two directions.

* * * * *